United States Patent [19]
Wilson

[11] 3,982,428
[45] Sept. 28, 1976

[54] GROOVED WHEEL-CONTACT ROLLERS FOR VEHICLE TESTING APPARATUS

[75] Inventor: Jack A. Wilson, West Covina, Calif.

[73] Assignee: Clayton Manufacturing Company, El Monte, Calif.

[22] Filed: Apr. 14, 1975

[21] Appl. No.: 567,993

[52] U.S. Cl. ............................................... 73/126
[51] Int. Cl.² ......................................... G01L 5/28
[58] Field of Search ............. 73/117, 123, 126, 146; 74/14; 29/121 H

[56] References Cited
UNITED STATES PATENTS

| | | |
|---|---|---|
| 2,144,793 | 1/1939 | Christensen .................. 29/121 H X |
| 2,696,104 | 12/1954 | Markey et al. ................... 73/117 X |
| 3,585,855 | 6/1971 | Albertson ............................. 73/117 |
| 3,651,758 | 3/1972 | Harrod .......................... 29/121 H X |

Primary Examiner—Jerry W. Myracle
Attorney, Agent, or Firm—Jackson & Jones Law Corporation

[57] ABSTRACT

Wheel-contact rollers for a vehicle test-bed have helical grooves formed in their outer surfaces to improve start-up friction by providing fast removal of water and other foreign materials from tire surfaces. The grooves are preferably formed by a thread-cutting or thread-forming process. The helical grooves should be equally-sloped left-hand and right-hand threads, in order to provide balanced side-to-side forces on the tire; however, the opposing left and right hand slopes may be formed on separate rollers, i.e., one slope on the left wheel roller and the opposite slope on the right wheel roller.

19 Claims, 8 Drawing Figures

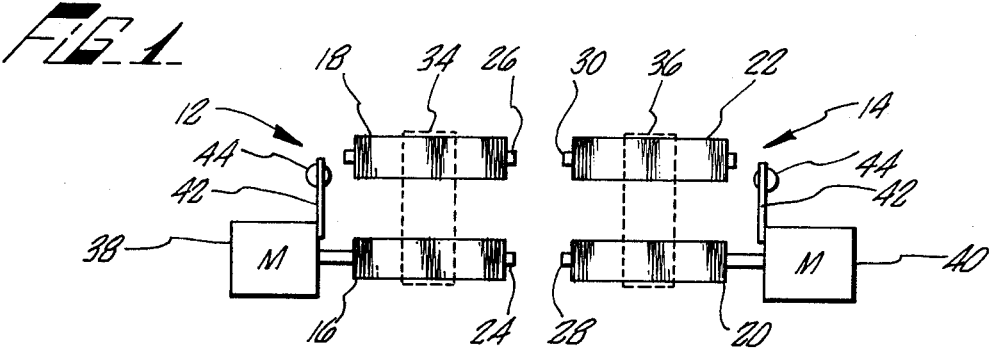
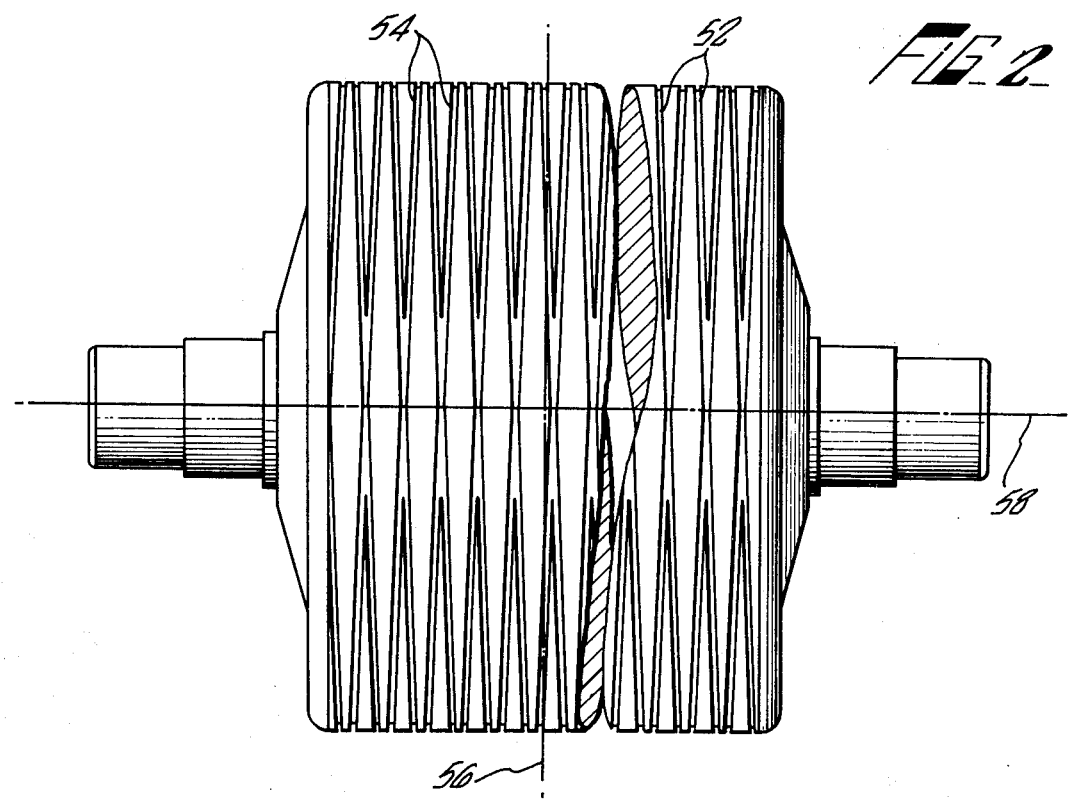
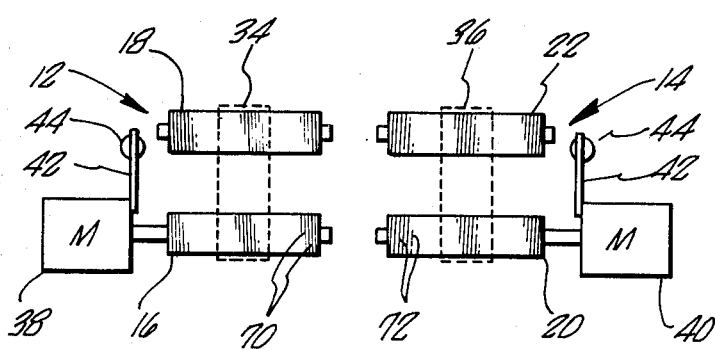
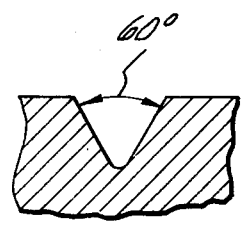

GROOVED WHEEL-CONTACT ROLLERS FOR VEHICLE TESTING APPARATUS

BACKGROUND OF THE INVENTION

This invention relates primarily to vehicle testing in which the vehicle wheels are supported on, and rotate with, rollers in a test bed. The concepts are equally applicable to situations in which the roller drives the wheel, such as brake analyzers or other motoring dynamometers, and to situations in which the wheel drives the roller, such as absorption dynamometers.

Problems encountered in such vehicle test beds are the slow start-up and wheel spinning which occur if the tires of the vehicle being tested are wet, and also if they have significant amounts of other foreign material, such as powdered material picked up from the road surfaces.

It is important that the means provided for removing water (and other materials) to reduce start-up time not create another problem in the form of excessive sound generation or noise.

Applicant is not aware of any prior art which shows helically grooved rollers which are designed to improve surface friction by using the grooves to remove water and other foreign materials. The prior art known to applicant does include rollers having surface grooves, or ridges, parallel to the axis of the rollers; and tire-contacting surfaces, grooves, or ridges, parallel to the direction of tire rotation. The grooves, or ridges, parallel to the roller axes tend to create excessive noise at high turning speeds. They are satisfactory for low-speed dynamometers, but not for high-speed dynamometers. Tire-contacting grooves, or ridges, which extend parallel to the direction of tire rotation do not provide a passage for lateral movement of the water to the sides of the tire, where it tends to leave the tire-roller contact surface in a spray.

I have found that greatly-improved results can be obtained by using helical grooves in the tire-engaging roller surfaces. In addition to providing a path for water removal, they seem to provide a "squeegee" effect on the tire which speeds up the water removal process.

SUMMARY OF THE INVENTION

In accordance with this invention, a dynamometer roller for vehicle wheel engagement is provided which has one or more helical grooves formed in its periphery. During engagement with the tire of a vehicle being tested, the helical groove or grooves assist in removing any water which may be on the periphery of the tire. Since the groove or grooves form an angle with the direction of the tire periphery, in order to avoid any tendency of the grooves to exert a lateral force on the tire, either each roller should have oppositely-inclined grooves, or the left and right wheel-engaging rollers should have oppositely inclined grooves.

The grooves are preferably formed by a thread-cutting process, both because that is an economical method of manufacture and because that provides continuous grooves which permit lateral movement of water in the grooves until the water is beyond the sides of the tire.

BRIEF DESCRIPTION OF THE DRAWING

FIG. 1 is a diagrammatic plan view of a vehicle test bed for a brake analyzer, having tire-engaging rollers for both the left and right vehicle wheels.

FIG. 2 is a close-up view of the surface of one of the rollers of FIG. 1.

FIG. 3 is a greatly enlarged cross-sectional view of the groove as it is formed in the roller in FIG. 2; and FIG. 4 is a diagrammatic plan view of a vehicle test bed for a brake analyzer, showing a somewhat modified roller groove configuration for the left and right tire-engaging rollers.

DETAILED DESCRIPTION OF THE PREFERRED AND MODIFIED EMBODIMENTS:

In FIG. 1, a vehicle test bed is shown having a left wheel bed 12 and a right wheel bed 14. In bed 12 are two rollers, a drive roller 16 and an idler roller 18. In bed 14 are a drive roller 20 and an idler roller 22. The supporting shafts 24, 26, 28, and 30 of the respective rollers provide their support and define their axes of rotation. Suitable bearings support the ends of the four supporting shafts.

Each vehicle tire (left and right wheels) rests on one pair of rollers. Assume the left vehicle tire 34 is supported on the rollers 16 and 18, and the right tire 36 is supported on the rollers 20 and 22. During the testing of the vehicle brakes, the drive rollers 16 and 20 are rotated by electric motors 38 and 40, respectively. The motor housings may be supported in cradle bearings, so that motor reaction torque forces from each motor housing may be transferred by torque arms 42 to force transducers 44 which measure the brake effort.

Although the foregoing illustrative arrangement shows a brake analyzer system in which the drive rollers cause rotation of the vehicle wheels during the test, the present invention is equally applicable to any test arrangement in which the vehicle wheels drive the rollers, such as energy-absorption dynamometers. Where the dynamometer is operating to absorb energy from the vehicle wheels, suitable power absorption units are coupled to the drive rollers 16 and 20. For example, the motors 38 and 40 may be employed as generators to absorb the energy in a well known manner if desired.

As indicated above, it is the primary purpose of this invention to provide better roller-to-tire frictional engagement, particularly during the test start-up periods, and particularly where the vehicle tires have substantial amounts of surface moisture when they are placed on the dynamometer bed.

This invention is primarily intended for high-speed dynamometers, because it accomplishes its aims of moisture removal and fast start-up in a way which is relatively quiet at high rotation speeds. Other configurations which might be satisfactory in low-speed dynamometers have invariably caused excessive noise when run at high speeds.

The grooved configuration of the roller surfaces is shown on all four rollers in FIG. 1, i.e., on the idler rollers as well as the drive rollers. While the helical groove configuration is essential on the drive rollers, it need not be used on the idler rollers; but its use there does provide an enhanced performance.

As shown in FIG. 2, the surface of each drive roller has one or more helical grooves. In the preferred version, there is at least one continuous right-hand helical groove 52 and at least one continuous left-hand helical groove 54. The grooves 52 and 54 are preferably formed by the same cutting process as that normally used in forming threaded surfaces.

Numerous variations of the specific dimensions shown in FIGS. 2 and 3, and used in actual working embodiments, can be made without sacrificing the benefits, and perhaps in some instances actually increasing the benefits, of the present invention. In a form of the invention used in a working embodiment, the pitch is very shallow, the "angle of inclination" of each of the thread-formed grooves 52 and 54 being about 1° with respect to an imaginary line 56 paralleling the direction of rotation of the roller and tire. There are two intersections per inch of each groove with an imaginary line 58 extending along the surface of the roller parallel to the axis of rotation of the roller. As shown in FIG. 3, each groove cross-section has a thread angle of about 60°, i.e., the angle between its opposite inclined sides; and each groove cross-section has a depth of about 0.040 inch.

I would prefer wider and deeper grooves, because they would have more space to receive water from the tire surface, and would, therefore, permit more rapid water removal. However, manufacturing cost considerations favor the dimensions shown in the exemplary embodiment of FIG. 3.

I would also prefer a larger angle of inclination, i.e., a steeper pitch than the 1° referred to above. But, here again, manufacturing cost considerations have affected the design choices. A somewhat steeper angle, combined with multiple parallel threads, or grooves, would permit faster water removal. However, an angle of about 30° would be an upper limit because production costs would become prohibitive; and also noise problems tend to increase as the grooves come closer to paralleling the axis of rotation of the rotors. As a preferred configuration, considering performance and cost factors, I would suggest one thread or groove for each inch of roller width in a two-parallel-thread arrangement, or one groove for each two inches of roller width in a four-parallel-thread arrangement.

While the water removal benefit would be provided by grooves having only right-hand or only left-hand helical configurations, such an arrangement would exert lateral force on the tire tending to move it (and the vehicle) off the roller. Therefore, it is desirable to have oppositely inclined grooves to provide balanced lateral, or transverse, forces on the tire.

FIG. 4 illustrates a vehicle test bed in which the left tire-engaging roller 16 has grooves 70 of one inclination only, say right-hand thread, and the right tire-engaging roller 20 has grooves 72 of the other inclination only, say left-hand thread. Therefore, although there is a lateral force exerted by the roller on each tire, the force on the left tire tends to balance the force on the right tire, so the vehicle is not urged laterally.

As stated above, this grooved roller arrangement dramatically reduces start-up time in vehicle testing because it avoids spin by improving the tire-to-roller traction, and by removing surface moisture quickly from the tires. The water is sprayed out behind the tire, and predominantly at the sides of the tire. Tests have also demonstrated that the present invention significantly improves dynamometer performance, because it tends to separate non-liquid foreign substances from the drive rollers. Such substances may be powdered or similar materials picked up by vehicle tires and deposited on the rollers during tests. Removal of such materials, as well as water removal, improves very noticeably the traction between rollers and tires.

What is claimed is:

1. A vehicle test bed having a first roller for engaging the left vehicle wheel to rotate therewith by frictional peripheral contact, and a second roller for engaging the right vehicle wheel to rotate therewith by frictional peripheral contact, said first and second rollers each having at least one helical groove in its wheel-engaging periphery to improve traction between the interengaging surfaces of the roller and wheel, the groove in the first roller having an opposite angle of inclination from that of the groove in the second roller.

2. The structure of claim 1 in which the roller grooves are formed by a thread-cutting process.

3. The structure of claim 1 in which the oppositely-inclined grooves have the same magnitude of their respective angles of inclination with respect to a line paralleling the direction of rotation of the roller and wheel, thereby balancing the lateral forces exerted by the grooves on the wheel.

4. The structure of claim 3 in which the angle of inclination of the helical groove or grooves with respect to a line paralleling the direction of rotation of the roller and wheel is at least 1°.

5. The structure of claim 4 in which the angle of inclination of the helical groove or grooves with respect to a line paralleling the direction of rotation of the roller and wheel is no greater than 30°.

6. In a dynamometer for testing vehicle wheel brakes, the improvement comprising:
a drive roller designed to engage and rotate with a wheel or the like by frictional peripheral contact having two continuous, spirally-winding, criss-crossing grooves encircling its periphery, said grooves being inclined at equal angles in opposite directions from a line parallel to the direction of rotation of the roller to provide a symmetrical configuration along its axial dimension, and said grooves having an angular divergence from a line parallel to the direction of rotation of the roller of at least 1° but no greater than 30°.

7. In a dynamometer for absorbing power from or supplying power to at least one vehicle wheel, the combination which comprises:
a drive roller for engaging and rotating with said vehicle wheel by frictional peripheral contact, the drive roller having at least one helical groove in its wheel engaging periphery; and
means for rotatably supporting the drive roller and means for applying torque to or absorbing torque from the drive roller.

8. The structure of claim 7 wherein a pair of drive rollers are provided and in which there are a plurality of parallel helical grooves in each drive roller.

9. The combination as defined in claim 7 wherein the drive roller has at least two oppositely-inclined, criss-crossing helical grooves in its wheel-engaging periphery to improve traction by removing water or other foreign substances from the inter-engaging surfaces of the roller and wheel.

10. The structure of claim 9 in which the oppositely-inclined grooves have the same magnitude of their respective angles of inclination with respect to a line paralleling the direction of rotation of the roller and wheel, thereby balancing the lateral forces exerted by the grooves on the wheel.

11. The structure of claim 10 in which the angle of inclination of the helical groove or grooves with respect to a line paralleling the direction of rotation of the roller and wheel is at least 1°.

12. The structure of claim 11 in which the angle of inclination of the helical groove or grooves with respect to a line paralleling the direction of rotation of the roller and wheel is no greater than 30°.

13. The combination as defined in claim 7 wherein the last named means includes an electric motor for applying torque to the drive roller.

14. The combination as defined in claim 13 further including an idler roller spaced from the drive roller.

15. In a power absorbing dynamometer for use in testing a pair of vehicle wheel brakes, the combination which comprises:
a vehicle test bed;
first and second drive rollers and first and second idler rollers rotatably mounted on the test bed, the first drive and idler rollers arranged to support and rotate with the left vehicle wheel, the second drive and idler rollers being arranged to support and rotate with the right vehicle wheel, the first and second drive rollers each having at least one helical groove in the wheel engaging periphery thereof to improve traction between the interengaging surfaces of the roller and wheel and to permit rapid water removal from the vehicle wheels, the groove in the first roller having an opposite angle of inclination from the groove in the second roller; and
means coupled to the drive rollers to supply torque thereto for rotating the drive rollers while the vehicle wheels brakes are being applied.

16. The structure of claim 15 in which the oppositely-inclined grooves have the same magnitude of their respective angles of inclination with respect to a line paralleling the direction of rotation of the roller and wheel, thereby balancing the lateral forces exerted by the grooves on the wheel.

17. The structure of claim 16 in which the angle of inclination of the helical groove or grooves with respect to a line paralleling the direction of rotation of the roller and wheel is at least 1°.

18. The structure of claim 17 in which the angle of inclination of the helical grooves with respect to a line paralleling the direction of rotation of the rollers and wheels is no greater than 30°.

19. The structure of claim 18 in which each drive roller defines a left hand and right hand helical groove on the surface thereof.

* * * * *